R. G. HARRIS.
TRAP NEST.
APPLICATION FILED NOV. 3, 1917.
1,296,388.
Patented Mar. 4, 1919.
2 SHEETS—SHEET 2.
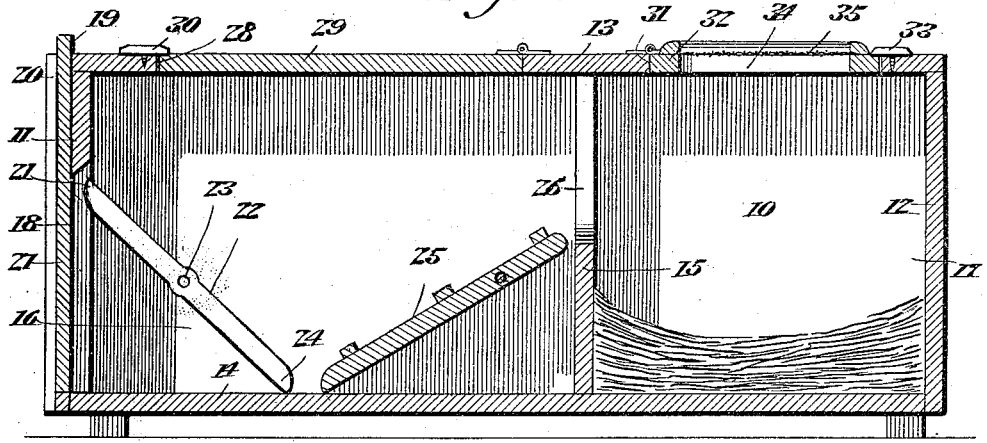
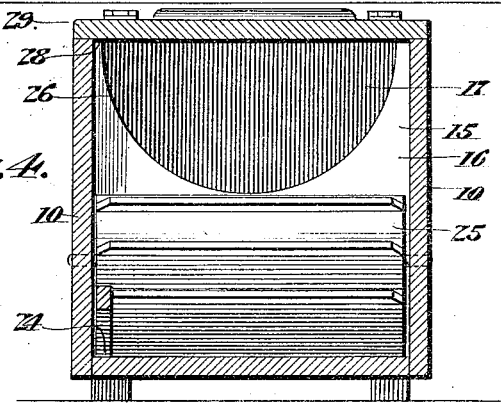
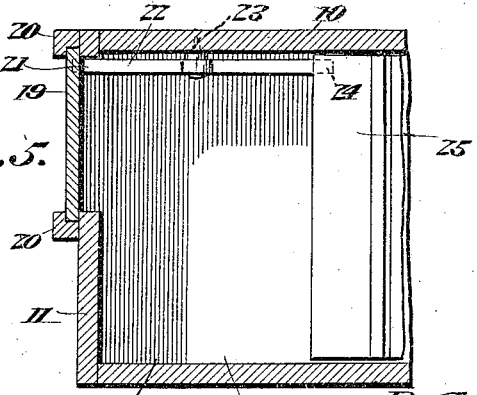
Inventor
R. G. Harris
By Victor J. Evans
Attorney
Witness

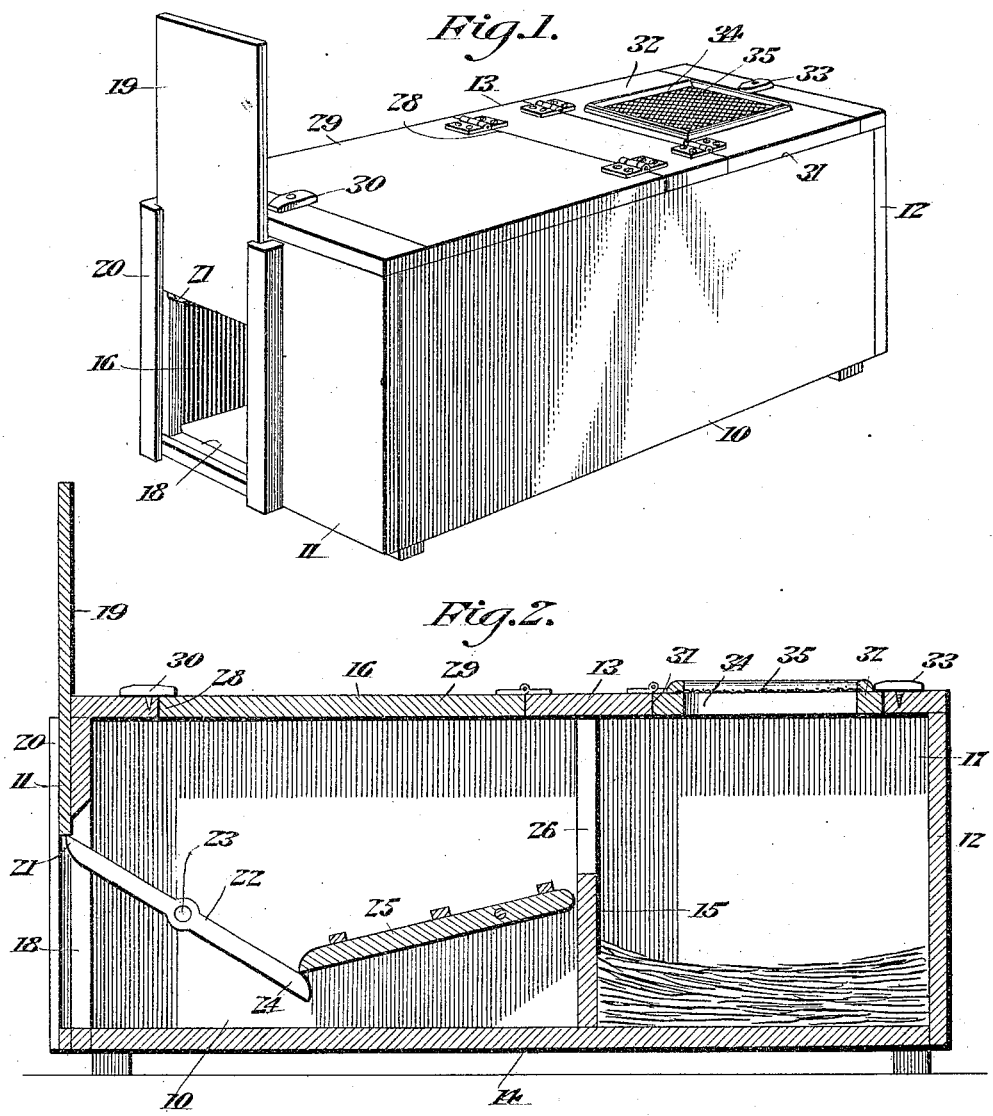

UNITED STATES PATENT OFFICE.

RALPH GORDAN HARRIS, OF SALIDA, COLORADO.

TRAP-NEST.

1,296,388.              Specification of Letters Patent.         Patented Mar. 4, 1919.

Application filed November 3, 1917. Serial No. 200,152.

*To all whom it may concern:*

Be it known that I, RALPH GORDAN HARRIS, a citizen of the United States, residing at Salida, in the county of Chaffee and State of Colorado, have invented new and useful Improvements in Trap-Nests, of which the following is a specification.

This invention relates to improvements in nests and has especial relation to trap nests for fowls for the purpose of selecting the laying hens from the drones.

The primary object of the invention is to provide a nest having a simple and novel form of trap operating means, which may be easily set to permit the entrance of the fowl within the nest and which is positive in operation, so that the said fowl will not be allowed to escape.

It is also the purpose of the invention to construct the nest in such a manner that all of the parts will be readily accessible, thereby providing means for keeping the nest in a clean and sanitary condition.

A further object is to eliminate all movable parts from the nest proper so that the same may be utilized for setting hens and the eggs not disturbed during her entrance or exit, this method of construction also permitting the more ready elimination of insects common to devices of this character.

With the above and other objects in view, the invention consists of the following novel combination and arrangement of parts, hereinafter more fully described and illustrated in the accompanying drawings, in which—

Figure 1 is a perspective view of a nest embodying the present invention, the entrance door being open to permit the entrance of the fowl therein;

Fig. 2 is a vertical longitudinal sectional view of the same taken through the entrance door;

Fig. 3 is a similar view showing the parts in the position after the entrance of the fowl;

Fig. 4 is a transverse sectional view through the entrance compartment looking toward the nest opening; and Fig. 5 is a fragmentary horizontal sectional view through the entrance door.

Referring more specifically to the drawings, like characters of reference denote corresponding parts throughout the several views.

In the form of the invention illustrated, the nest includes a compartment consisting of side walls 10, end walls 11 and 12 and top and bottom walls 13 and 14 respectively. This provides a substantially rectangular receptacle of elongated shape, which is divided by means of a partition 15 into an entrance compartment 16 and a nest compartment 17.

The front wall 11 is formed at one side thereof with an entrance opening 18, through which the fowl is permitted to enter the nest. This opening is adapted to be closed by means of a sliding door 19, this door being guided in ways 20 located upon each side of the entrance opening 18. While the door is shown and described as being located at one side of the front wall 11, it is not the purpose to limit the invention to this particular position of the door, as the said door may be equally well placed at some other point in the nest, for example, in one of the side walls 10.

The door 19 is of the gravity type as shown and is adapted to be held in an open position through the engagement of one end 21 of the pivoted element in the form of a lever 22 which is pivoted as shown at 23 to the inside of one of the side walls 10. The opposite end 24 of the lever 22 is located in the path of and adapted to be engaged by the pivoted platform 25, which extends entirely across the width of the entrance compartment. The platform 25 is located adjacent the partition 15 and in front of an opening 26 formed in said partition adjacent the top wall 13, so that the fowl before passing through this opening is obliged to press upon the platform 25.

Formed in that portion of the top wall 13 which overlies the entrance to the compartment is an opening 28, through which the door 19 may be opened and the compartment cleaned.

The opening 28 is adapted to be closed by a hinged door 29, which is held in position by a button or other fastening device 30 in order to prevent the escape of the fowl. The top wall which overlies the nest compartment is also provided with an opening 31, which is adapted to be closed by a hinged door 32 provided with a button 33. In addition, the door 32 is provided with a ventilating opening 34 which is covered by a suitable screen 35.

While the device is illustrated and described for use as a trap nest, it is obvious that it may be utilized as an animal trap, the portions thereof being changed to suit.

Various changes may be made in the form and minor details of construction and it is understood that the right is reserved to make such changes as will fall within the scope of the appended claims.

Having described the invention, what is claimed is:

1. A trap nest embodying a receptacle, a partition dividing said receptacle into an entrance compartment and a nest compartment, said partition having openings therein establishing communication between the compartments, an entrance opening for said receptacle, a gravity door for said entrance opening, a door engaging lever pivoted intermediate its ends and located within the entrance compartment and a pivoted platform located at the partition opening in the path of the fowl and having one end normally resting on one end of the pivoted lever for supporting the web of the door in open position.

2. A trap nest embodying a receptacle, a partition dividing said receptacle into an entrance compartment and a nest compartment, said partition having openings therein establishing communication between the compartments, an entrance opening for the receptacle, a gravity door for said entrance opening, a pivoted platform located at the partition opening in the path of the fowl and a lever having obtuse angled ends and pivoted within the entrance compartment and having one arm normally positioned beneath the door and the other arm normally positioned beneath the pivoted platform.

In testimony whereof I affix my signature.

RALPH GORDAN HARRIS.

Copies of this patent may be obtained for five cents each, by addressing the "Commissioner of Patents, Washington, D. C."